United States Patent [19]

Grier et al.

[11] 4,335,000

[45] Jun. 15, 1982

[54] CHROMATE ION REMOVAL FROM AQUEOUS SOLUTIONS

[75] Inventors: Jesse G. Grier, Gilbertsville, Ky.; Jimmie R. Hodges, Downington, Pa.

[73] Assignee: Pennwalt Corporation, Philadelphia, Pa.

[21] Appl. No.: 118,047

[22] Filed: Feb. 4, 1980

Related U.S. Application Data

[63] Continuation-in-part of Ser. No. 956,755, Nov. 1, 1978, abandoned, which is a continuation of Ser. No. 832,866, Sep. 13, 1977, abandoned.

[51] Int. Cl.$^3$ ............................................... C02F 1/42
[52] U.S. Cl. .................................... 210/662; 210/670; 210/684; 210/686; 521/26
[58] Field of Search ........ 210/662, 670, 678, 684–686; 204/95; 423/54; 521/26, 28, 29, 32, 33

[56] References Cited

U.S. PATENT DOCUMENTS

| | | | |
|---|---|---|---|
| 3,501,401 | 3/1970 | Calman | 210/670 |
| 3,835,001 | 9/1974 | O'Brien | 423/54 X |
| 3,972,810 | 8/1976 | Chopra | 210/33 |
| 4,036,751 | 7/1977 | Ovita et al. | 210/662 |

*Primary Examiner*—S. Leon Bashore
*Assistant Examiner*—Ferris H. Lander

[57] ABSTRACT

Chromate ions present in aqueous solutions, e.g. cooling tower blowdown water or liquors obtained from the electrolysis of aqueous sodium chloride solutions, are substantially completely removed by passing the solution through an intimate mixture of an anion exchange resin in the chloride form and a weak cation exchange resin in a conditioned hydrogen form.

17 Claims, No Drawings

CHROMATE ION REMOVAL FROM AQUEOUS SOLUTIONS

BACKGROUND OF THE INVENTION

Cross References to Related Applications

This is a continuation-in-part of copending application Ser. No. 956,755 filed Nov. 1, 1978 now abandoned which is a continuation of application Ser. No. 832,866 filed Sept. 13, 1977, now abandoned.

THE PROBLEM

Chromate salts are frequently dissolved in various aqueous process solutions as process aids or to prevent corrosion of the process equipment. The chromium ions from these dissolved salts produce a distinctly yellow colored solution. To provide clear white liquid products suitable for commercial use or to eliminate the color which causes environmental problems on disposal, substantially all of the chromium ions must be removed from these aqueous solutions, i.e., less than 10 p.p.m. of chromium should remain in the solution.

DESCRIPTION OF THE PRIOR ART

It is well known to employ ion exchange resins to remove chromate ions from aqueous solutions. U.S. Pat. No. 3,414,510, reissued on Aug. 7, 1979, as U.S. Pat. No. Re. 30,066, discloses a process for removing inorganic chromate from water which has been used as a cooling medium in industrial applications. A solution containing at least 1000 ppm of dissolved solids including chromates is passed through a bed of acidified weakly basic anion exchange resin to cause selective removal of chromate ions. The influent solution is adjusted to a pH of from about 3.0 to 5.0. U.S. Pat. No. 3,972,810 issued Aug. 13, 1976, teaches the use of a bed of a mixture of weak base anion exchange resin in the salt form and weak acid cation exchange resin in hydrogen ion form through which an aqueous solution of hexavalent chromium ions and trivalent chromium ions is passed to remove most of the chromate ions. Sequential treatment of the spent exchange resin with caustic and mineral acid solutions acts to regenerate the spent resin by stripping chromium ions from it and placing the anion resin in the salt form and the cation resin in the hydrogen form. U.S. Pat. No. 3,835,001 discloses a method for the removal of chromate ions from an aqueous alkali metal chlorate-chloride feed solution wherein the feed solution having a pH of less than 6.5 and preferably about 5 is passed through a bed of strong base anion exchange resin in the chloride form. While the patented process effects removal of a substantial proportion of chromate ions, there is a need for removing even more for ecological reasons.

STATEMENT OF THE INVENTION

This invention relates to a process for removing chromate ions from aqueous feed solution comprising (a) passing said feed through an ion exchange resin bed comprising an intimate mixture of an anion exchange resin in the chloride form and a weak cation exchange resin in the conditioned hydrogen form, in which mixture (i) the total amount of exchange sites on the anion resin is sufficient to remove the chromate ions from the feed and (ii) the cation exchange resin has a number of exchange sites not substantially less (e.g. no less than about 0.75 of the anion sites) than the number of exchange sites present in the anion exchange resin (b) monitoring the pH of the effluent aqueous solution and (c) halting the feed whenever the pH of the effluent rises above about 2. The effluent pH will be a function primarily of the ratio of exchange sites between the anion and cation resins, the higher proportion of cation exchange sites promoting a lowering of the pH. The pH of the effluent of the initial flow of feedstock may be above 2, depending upon the amount of pH rise during the conditioning step, but after continuous flow is established the effluent pH will drop below 2. It is an important characteristic of the process of the present invention that the pH will not drop below 1, since lower pH values promote decomposition of any chlorates that might be present.

DEFINITIONS

By "condition hydrogen form" is meant that a portion of the hydrogen ions originally present on the cation exchange resin has been displaced with alkali metal ions.

"Exchange sites" present on an ion exchange resin can be measured as "total exchange capacity." While the method for measuring this parameter differs somewhat among suppliers of resins, a generally satisfactory method specifically recommended for Amberlite IRC-50 involves equilibrating a representative sample of resin in the hydrogen form with an excess of 0.1 N sodium hydroxide. The resin should remain in contact with the excess caustic for 24 to 48 hours. The amount of sodium hydroxide neutralized is considered equivalent to the maximum capacity of the exchanger. Results are expressed as milliequivalents/milliliter or milliequivalents/gram.

PREPARATION OF RESIN BED

Exchange resins useful for this invention may be either of the gel or the macroreticular type, the latter being preferred because of its greater structural stability. Suitable resins, (i.e. containing the required number of exchange sites) may be found in the Kirk-Othmer Encyclopedia of Chemical Technology, Second Edition, Volume II, pages 871 et seq. They include Amberlite IRA-93 (a macroreticular, weak base anion exchange resin containing tertiary amine functionality on a styrenedivinylbenzene matrix supplied in the free base form), Amberlite IRA-94 (a macroreticular, weakly basic anion exchange resin having similar physical and chemical characteristics to IRA 93 but with improved kinetics and physical stability), Amberlite IRA 400, (a strongly basic, quarternary ammonium gel-type anion exchange resin of standard porosity produced with divinylbenzene as the crosslinking agent and is supplied in either the chloride or hydroxide form), Amberlite IRC 50, (a macroreticular, weakly acidic, cation exchange having a divinylbenzene crosslinked methacrylic acid polymer matrix shipped in the hydrogen form as white opaque spherical particles), and Amberlite IRC 84, (a gel-type weakly acidic cation exchange resin having a divinylbenzene crosslinked acrylic polymer matrix and which is supplied in the hydrogen form as spherical particles) all marketed by the Rohm and Haas Company. Resins of similar exchange activity supplied by other manufacturers may also be used in the process.

It is essential in the process of the present invention that the cation resin be a weak acid cation resin; the anion exchange resin on the other hand may be either a weak or a strong base resin, although use of a weak base anion resin is preferred. The two types of resins cation and anion, in proper proportion are mixed mechanically or by a conventional technique such as air-mixing under water. Because of the differences in exchange capacities of various cation and anion resins the proportion of cation to anion resin in any bed may vary from about 0.25 parts of cation to 2.0 parts by weight of cation for each part of anion.

THE MANIPULATIVE STEPS

In the continuous embodiment of the process of the present invention, after physical mixing of the resins and forming them into a suitable bed, the process proceeds through four operations:

1. Stripping—The operation whereby previously absorbed chromate on the resin is removed by contacting the resin with a flow of aqueous caustic;
2. Regenerating—The operation wherein the chloride form of the aion exchange resin is formed by contacting the resin with aqueous hydrochloric acid;
3. Conditioning—The operation wherein the resin is contacted with neutral brine to thereby replace a portion of the hydrogen ion originally on the cation resin with alkali metal;
4. Servicing—The operation wherein an aqueous feed stock containing dissolved chromate and having a pH of at least about 4 is continuously flowed through the mixed bed of resin for as long as the pH of the effluent does not rise above about 2, thereby causing chromium ions to be absorbed preferentially on the anion resin.

When the resin becomes spent in the servicing step, the four operations are again sequentially performed to provide continuous operation.

It is preferred in the servicing operation that the feed liquid be passed upward (i.e. against the force of gravity) when contacting the feed solution with the mixed resins. However contacting of the resins and various liquids in the stripping, regenerating or conditioning steps with the resins may be done as conveniently in the direction of gravitational force as opposite thereto.

THE STRIPPING STEP

In the stripping operation chromate ion is removed by passing a weakly alkaline (about 4% NaOH) brine over the anion resin on which the chromate ion has been preferentially absorbed. In this process chromate ion is replaced by hydroxyl ion on the anion resin and when cation resin is present during stripping, the hydrogen ion is replaced by sodium ion on the cation resin. Contact with fresh stripping brine is continued until the effluent becomes colorless. Since the cation resin absorbs virtually no chromate, the two types of resin may be separated before stripping. Stripping the cation and anion resins separately results in a saving of acid required to regenerate the cation resin in the subsequent steps of the operation. Furthermore using the "split resin" technique during servicing makes it possible to use the cation resin for several cycles without subsequent regenerating and conditioning, resulting in further savings. However, if the feedstock contains chlorate and the cation and anion resins are separated for stripping chromate from the anion resin, it is important to rinse all feedstock from the cation resin prior to the regenerating step to avoid formation of potentially explosive chlorine dioxide.

The Regenerating Step

The anion resin, free of chromate ions, is put in chloride form by contacting the resin with at least an equivalent amount of a relatively weak aqueous mineral acid solution.

A 4% hydrochloric acid in brine (4–12% NaCl) is suitable. In this operation chloride ions replace hydroxyl ions on the anion resin. If the two types of exchange resins are mixed at the time of regenerating, hydrogen ions on the cation resin are replaced by sodium ions; however, as pointed out above the resins need not be mixed for this operation, although frequently it is convenient to regenerate the anion resin without separating them.

Conditioning

It is the essence of the invention that the anion and cation resins be intimately mixed during the servicing of feedstock and that the cation resin be in the conditioned hydrogen form. Conditioning of the cation resin is necessary to prevent excessive acidification caused by salt-splitting of the sodium chloride component of the feed solution during the serving step. Salt splitting occurs when a solution containing a salt of a strong acid and a strong base is passed through a strong acid or base ion exchange resin since the cation of the salt exchanges with the hydrogen of strong acid resins and the anion of the salt exchanges readily with the hydroxide of strong base resins. Although usually salt splitting does not occur when one operates with weak acid and weak base exchangers (which are preferred in the process of the present invention) the phenomenon has been found nevertheless to occur in the absence of intimately mixed conditioned cation resin in proper proportion. This salt splitting is believed due to the high concentration of dissolved salts (especially in chlorate solutions).

Conditioning the cation exchange resin (either separated or mixed with the anion resin) is accomplished by passing a flow of an aqueous solution containing alkali metal ions (such as, for instance, alkali metal chloride brine) preferably at a neutral pH (e.g. a pH of 6 to 8) until the pH of the effluent is at least above 1 and preferably about equal to the pH of the brine being supplied for the purpose. If the stripping and regenerating operations have occured with the anion and cation resins separated conditioning of the cation resin is thereafter unnecessary for several cycles since only the anion resin becomes entirely spent during servicing, the cation being only partially used in the exchange process of the servicing step. After conditioning of the weak cation resin and intimate mixing of it with the regenerated anion exchange resin in the chloride form, the mixture of resin, packed in a suitable column is ready for receiving the aqueous chromate/salt solution to remove chromate in the servicing operation.

Servicing

The feedstock useful for treatment according to the present invention for chromate removal is an aqueous solution containing a relatively high concentration of salt and dissolved chromium ions at very low concentrations; obviously solutions containing high concentrations of chromium ion may also be serviced. The process of the invention has particular utility in the removal of chromate ions from the aqueous solutions resulting from the electrolytic production of chlorates, such solutions being characterized by a high concentration of both sodium chloride and sodium chlorate in addition to chromates. The presence of the chlorates makes the solutions hazardous to handle, particularly at low pH (e.g. below about 1). It has been found that sodium solutions containing as high as 650 grams/liter of sodium chlorate and 120 grams/liter of sodium chloride (al 26.7° C.) are amenable to the present process. Obviously, concentrations of salts so high that salting out occurs in the exchange column should be avoided.

The feedstock is passed through the resin exchange bed at a flow rate which provides a narrow absorption front. Preferably the pH of the feedstock is above about 4 and the flow rate is maintained as high as is consistent with avoidance of a broadening of the absorption front.

The color and pH of the effluent from the resin bed are continuously monitored. Flow through the bed is interrupted whenever the effluent pH rises above about 2 (above which point a yellowish tint will usually be visible indicating that the anion resin is spent). After the anion component of the bed is spent, the consecutive procedures of stripping, regenerating and conditioning may be repeated to permit further servicing. The following examples are used to illustrate the invention. They are not intended to limit it in any manner. In each example the feedstock is intended to typify those produced in the electrolytic production of sodium chlorate from an aqueous sodium chloride solution.

EXAMPLE I

A 1.9 cm. diameter column is packed to a height of 132 cm. with an intimate mixture of a weak cation exchange resin of the macroreticular type (Amberlite IRC 50) and weak anion exchange resin of the macroreticular type (Amberlite IRA 93) in the weight ratio of 60:40. This produces a bed wherein the cation exchange resin has 1.8 times the exchange sites of the anion resin.

The mixed resin bed is washed with a 4% aqueous sodium hydroxide solution in a downward direction through the column then the anion is regenerated with a 4% aqueous hydrochloric acid solution until the pH of the effluent drops below 1.5. A conditioning downward wash with nearly saturated, neutral aqueous sodium chloride solution is made, until the effluent pH rises to 1.5.

In the servicing step an aqueous feedstock containing 450 grams/liter of sodium chlorate and 1.02 grams/liter of sodium dichromate is passed upward through the resin bed at a rate of 5 cc/minute. 1850 cc of colorless product is collected before the effluent becomes visibly yellow. The effluent pH during this time rises steadily from 1.6 to 2.05. After 150 cc. of additional flow, the effluent contains 24.6 (p.p.m.) of sodium dichromate ($Na_2CR_2O_7$) and has a pH of 2.15.

Successive samples of effluent are taken and analyzed for pH. The color of each sample is noted as a check for chromate content, a colorless sample indicating the substantial absence of chromate i.e., below 10 p.p.m. The following table contains the pH and observation data for each sample.

TABLE I

| Sample | Bed Volume of Feed Liquor* | Chromate in Effluent (Color Indication) | Effluent pH |
| --- | --- | --- | --- |
| 1 | 1.42 | colorless | (2.3)** |
| 2 | 1.85 | colorless | 1.6 |
| 3 | 3.57 | colorless | 1.67 |
| 4 | 4.28 | colorless | 1.77 |
| 5 | 5.00 | colorless | 1.90 |

TABLE I-continued

| Sample | Bed Volume of Feed Liquor* | Chromate in Effluent (Color Indication) | Effluent pH |
| --- | --- | --- | --- |
| 6 | 5.28 | slight yellow | 2.05 |
| 7 | 5.70 | distinct yellow (24.6 p.p.m.) | 2.15 |

*"Bed Volume of Feed Liquor" is a term that is used for comparing the capacities of ion exchange columns of varying size. One bed volume is the overall volume occupied by the resin bed (square foot of cross section times height)
**The pH of the first sample is higher because it precedes flow-thru of the feedstock.

EXAMPLE II

In a 10 inch diameter column especially piped for cycling a continuous ion exchange process, a mixed resin bed is prepared by air mixing under water 1 part by weight of a weak cation resin (Amberlite IRC 84) with 2 parts by weight of a weak anion resin (Amberlite IRA 94) the mixture reaching a total height of 35 inches in the column. This ratio provides a bed wherein the exchange sites on the cation resin and 1.6 times those on the anion.

The bed is regenerated by passing a 4% solution of HCl in a NaCl brine downward until the effluent reaches a pH of 1.5. A conditioning step is then carried out by passing saturated NaCl brine (pH 9.5) downward. After an initial drop to 0.4 due to salt splitting, the pH of the brine effluent rises above 1.0 whereupon the brine rinse is stopped.

The servicing step is then begun with an upward flow at 0.25 gallons/minute of a liquor containing 450 grams/liter of sodium chlorate and 3.1 grams/liter of $Na_2Cr_2O_7$. The effluent remains colorless until 64 gallons are treated. The effluent pH is between 2.05 and 2.2 when the first yellow effluent flow appears. A stripping step to desorb chromate from the exchange resin is accomplished by passing an aqueous solution containing 4% NaOH in half saturated (12%) NaCl brine in a downward direction through the bed.

As in Example I successive samples of effluent are taken and the pH of each checked. The color of each sample is noted as a check for chromate content. The pH and color for each sample is given in the following table.

TABLE II

| Sample | Bed Volume of Feed Liquor | Chromate in Effluent (color indication) | Effluent Ph |
| --- | --- | --- | --- |
| 1 | 1.47 | colorless | 2.0 |
| 2 | 1.90 | colorless | 1.8 |
| 3 | 3.50 | colorless | 1.8 |
| 4 | 5.08 | colorless | 1.95 |
| 5 | 5.93 | colorless | 2.05 |
| 6 | 6.44 | slight yellow | 2.2 |
| 7 | 6.87 | definite yellow | 2.3 |

EXAMPLE III

This example is intended to illustrate the steps of stripping, regenerating and conditioning performed upon the separated cation and anion resins.

An ion exchange column 5 feet high × 6 inches diameter is loaded with 0.66 cubic feet of Amberlite IRC 50 and 0.33 cubic feet of Amberlite IRA-93 and the resins are mixed by airblowing under water. This provides 1.8 times exchange sites on the cation as on the anion resins. After draining the water, the bed is regenerated with 8% hydrochloric acid in an aqueous 12% sodium chloride solution until the effluent pH drops below 1.5.

Then, the cation resin is conditioned by passing a 12% neutral sodium chloride brine through the bed until the effluent pH is about equal to the influent pH. After conditioning, an aqueous feed solution consisting by weight of 38% sodium chlorate, 5% sodium chloride and 3 g./l. of sodium dichromate ($Na_2Cr_2O_7$) is passed upwardly through the bed at a rate of 0.67 g.p.m./sq.ft. until bed exhaustion.

The mixed resins are then transferred to a column of the same size as the service column and backwashed to separate the resin into several layers. The stratified bed is stripped by passing an 8% by weight solution of sodium hydroxide in 12% sodium chloride brine downwardly through the column. The resins are then regenerated by passing an 8% (by weight) solution of hydrochloric acid in 12% sodium chloride brine upwardly through the column. The flow rate for the passage of solutions in above described steps is 1 g.p.m./sq.ft. The resins are thereafter rinsed and then remixed by air-blowing in a neutral 12% sodium chloride brine. Conditioning is done via a resumed flow of brine through the resins until the effluent pH is about equal to the influent pH and the service step is then repeated.

It is found that this embodiment provides excellent chrome removal and requires lower acid volume to regenerate the cation and to neutralize the anion.

While the invention has been described with particular reference to chlorate containing aqueous solutions of chromium resulting from the electrolytic process for making chlorates, it is obvious that chromium containing blowdown water from cooling towers is equally useful as a feedstock.

What is claimed is:

1. A process for removing chromate ions from aqueous feed solution comprising (a) passing said feed through an ion exchange resin bed comprising an intimate mixture of an anion exchange resin in the chloride form and a weak cation exchange resin in the conditioned hydrogen form, in which (i) the total amount of exchange sites on the anion resin is sufficient to remove the chromate ions from the feed and (ii) the cation exchange resin has a number of exchange sites not substantially less than the number of exchange sites present in the anion exchange resin (b) monitoring the pH of the effluent aqueous solution and (c) halting the feed whenever the pH of the effluent rises above about 2.

2. The process of claim 1 wherein said aqueous feed solution is an alkali-metal chlorate solution.

3. The process of claim 2 wherein said aqueous feed solution also includes dissolved alkali-metal chloride.

4. The process of claim 3 wherein said alkali-metal chromate, chlorate and chloride are sodium chromate, chlorate and chloride.

5. The process of claim 1, 2, 3 or 4 wherein the adsorbed chromate ions are recovered from the anion exchange resin after termination of flow of said feed solution through the mixed exchange resin bed by passing an aqueous alkaline solution through said bed.

6. The process of claim 5 wherein said alkaline solution is sodium hydroxide dissolved in an aqueous sodium chloride solution.

7. The process of claim 5 wherein both the exchange resins are treated after recovery of the chromate ions by passing an aqueous solution of a mineral acid through said resins.

8. The process of claim 7 wherein said aqueous solution of mineral acid is hydrochloric acid in an aqueous sodium chloride solution.

9. The process of claim 8, wherein after treatment with said solution of mineral acid, the cation exchange resin is treated with a substantially neutral aqueous sodium chloride solution to condition said cation resin.

10. The process of claim 9 wherein the treatment is carried out by passing the neutral sodium chloride solution through the mixed exchange resin bed.

11. The process of claim 5 wherein prior to passage of said aqueous alkaline solution through the bed,
(i) said cation exchange resin is separated from said anion exchange resin,
(ii) said aqueous alkaline solution is passed at least through said anion exchange,
(iii) an aqueous solution of mineral acid is passed at least through said cation exchange resin to replace alkali metal ions with hydrogen ions, and
(iv) the exchange resins are remixed.

12. The process of claim 11 wherein said alkaline solution is sodium hydroxide dissolved in an aqueous sodium chloride solution and said solution of mineral acid is hydrochloric acid dissolved in an aqueous sodium chloride solution.

13. The process of claim 12 wherein after termination of the passage of said aqueous solution of hydrochloric acid through said cation resin, said cation resin, is conditioned by the passage therethrough of a substantially neutral aqueous solution of sodium chloride.

14. The process of claim 13 wherein said alkaline solution is passed through both anion and cation exchange resins and said mineral acid solution is passed through both anion and cation exchange resins.

15. The process of claim 14 wherein said feed solution is passed through said bed at a rate not exceeding 0.75 gallons per minute per square foot of bed.

16. The process of claim 14, wherein said anion exchange resin is a weak base resin.

17. The process of claim 16 wherein said exchange resins are both macroreticular.

* * * * *